(12) United States Patent
Dittmar (10) Patent No.: US 6,799,611 B2
(45) Date of Patent: Oct. 5, 2004

(54) DECORATIVE ICING DISPENSER (76) Inventor: Edbert E. L. Dittmar, 1386 E. Springdell Dr., Provo, UT (US) 84604

( * ) Notice: Subject to any disclaimer, the term of this patent is extended or adjusted under 35 U.S.C. 154(b) by 53 days.

(21) Appl. No.: 10/277,579

(22) Filed: Oct. 21, 2002

(65) Prior Publication Data
US 2004/0074920 A1 Apr. 22, 2004

(51) Int. Cl.$^7$ .................................................. B65B 3/16
(52) U.S. Cl. ............................ 141/114; 141/18; 141/67; 141/317; 222/206; 222/210; 222/212; 222/380
(58) Field of Search .............................. 141/10, 18, 67, 141/68, 114, 313–317, 328; 222/206–215, 380, 386

(56) References Cited

U.S. PATENT DOCUMENTS

RE27,780 E  * 10/1973  MacManus ................. 426/383
5,634,574 A     6/1997  McArthur et al.
5,816,450 A  * 10/1998  Alexander et al. .......... 222/179
5,826,758 A    10/1998  McArthur et al.

* cited by examiner

Primary Examiner—Timothy L. Maust
(74) Attorney, Agent, or Firm—David L. Tingey (57) ABSTRACT An icing dispenser having an expandable elastic reservoir on the handle proximal end which when loaded expands a reservoir bladder under an elastic bias that tends to return the bladder to its unexpanded condition, therein uniformly impressing constant pressure on the icing within the reservoir. A reservoir neck extends from the bladder through a handle passageway to a decorator icing tip. A butterfly valve within the reservoir neck modulates an amount of icing flowing through the tip with butterfly ends angled parallel to the passageway and urged into the pliable neck at a preferred angle, slightly deforming the neck to effect a valve seal. The handle is adapted for operation in an operator's fingers as a writing instrument with icing extrusion modulated by a lever on the handle being adjusted relative to the handle by the fingers.

18 Claims, 6 Drawing Sheets

DECORATIVE ICING DISPENSER

BACKGROUND

1. Field of the Invention

This invention relates to hand held icing dispensers, and more particularly to an icing dispenser that is self-pressurized independent of user squeezing.

2. Prior Art

It is well known to have hand held icing dispensers. Typically, a decorator tip is attached to an opening in a small collapsible bag filled with icing. An operator squeezes the bag to force icing from the bag through the decorator tip as the operator manipulates the tip about a surface to artistically decorate the surface with the icing.

Applying substantial hand pressure to squeeze out the icing while at the same time manipulating the tip with the wrist causes the operator's hand and forearm to fatigue, resulting in loss of productive time while the operator rests. Of additional concern is that continual hand squeezing and wrist twisting while squeezing over a prolonged period of time greatly increases risk of an operator developing carpel-tunnel syndrome.

It is an object of this invention to provide an icing dispenser with an internal pressure system that delivers icing through a same decorator tip attached to a handle comfortable and familiar to an operator without the operator squeezing or otherwise exerting force to extrude the icing from the handle or a bag.

SUMMARY

This object is achieved in an icing dispenser comprising a tip on a handle distal end and an expandable elastic reservoir on the handle proximal end. The elastic reservoir includes a neck that extends from an expandable reservoir bladder through a handle passageway to the tip. By design, the icing is retained within the bladder and the tip so the icing remains uncontaminated and the dispenser is easily cleaned. Cleaning then reduces to replacing the reservoir and washing the tip.

As the reservoir is loaded through a fill port under pressure, bladder expands under an elastic bias that tends to return the bladder to its unexpanded condition. This "ballooning" reservoir is an advantage over piston-type pressurizers. Pressing icing forward through a tip by movement of a piston causes the icing to extrude unevenly from the tip. With radial pressure exerted from the bladder inwardly to the icing and uniformly around the entire bladder surface, this balloon-type pressurizer impresses constant pressure on the icing within the bladder without pressure "dead spots," resulting in an even extrusion of icing from the tip. The pliable bladder is further preferred over other possible means of pressurizing its contents because of its mechanical simplicity.

A valve within the reservoir neck in the handle passageway modulates an amount of icing extruding through the tip and the passageway. The valve is typically a butterfly valve with wings rotating with a valve shaft extending through the neck out of the handle to a valve lever that controls the position of the butterfly wings in the neck. The valve seals the neck when ends of the butterfly wings close against the neck.

Although butterfly valves are commonplace, application to an icing dispenser requires a unique adaptation. Because icing characteristically comprises granular, undissolved sugar, a butterfly valve that would rotate butterfly wing ends to an orientation perpendicular to the passageway surface fails to seal the channel; sugar granules between the butterfly wing ends and the channel keep the butterfly wings from reaching its seal position. The butterfly valve of the present invention is therefore modified to include butterfly wing ends angled parallel to the passageway that urge the ends into the neck at a preferred angle, slightly resiliently deforming the neck around the ends to effect a seal. The angle is important because again the valve doesn't seal both when the angle is too high and when the angle is too low as measured from normal to the handle passageway surface. When the angle is high the butterfly wings simply rotate through, pushing the pliable neck out of their way, or they stick to the pliable neck near the perpendicular orientation, making it difficult for the wings to move away from the neck. When the angle is too low, pressure of the icing prevents the butterfly wings from closing. It has been experimentally determined that the angle of the butterfly wings at the seal position must be between 45 degrees and 60 degrees, and ideally at 55 degrees.

DETAILED DESCRIPTION OF THE INVENTION

The icing dispenser 5 of the present invention comprises a handle 10 with a through passageway 12 and an expandable reservoir 20 with a compliant skin 22. The reservoir 20 further includes an expandable bladder 24 inherently comprising an unrestricted and unencumbered passageway and a neck 26 extending through the handle passageway 12 and opening to a tip 30 removably secured to the handle 10 at its distal, or forward, end 14.

Figure 4:
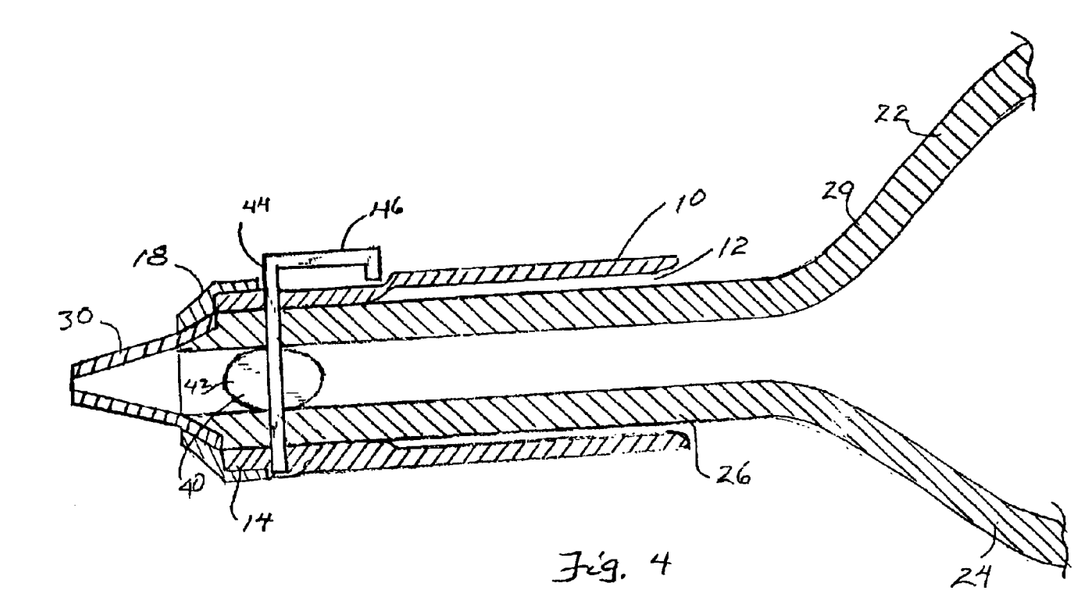
FIG. 4 is a cross-sectional side view of the dispenser showing the butterfly valve in the reservoir neck near its end. The tip is shown detachably mounted to the handle distal end by a removable threaded cap matching threads on the handle end with the tip passing through a central hole in the cap. The reservoir is also shown with its neck extending from the bladder through the handle to the tip.
Figure 5:
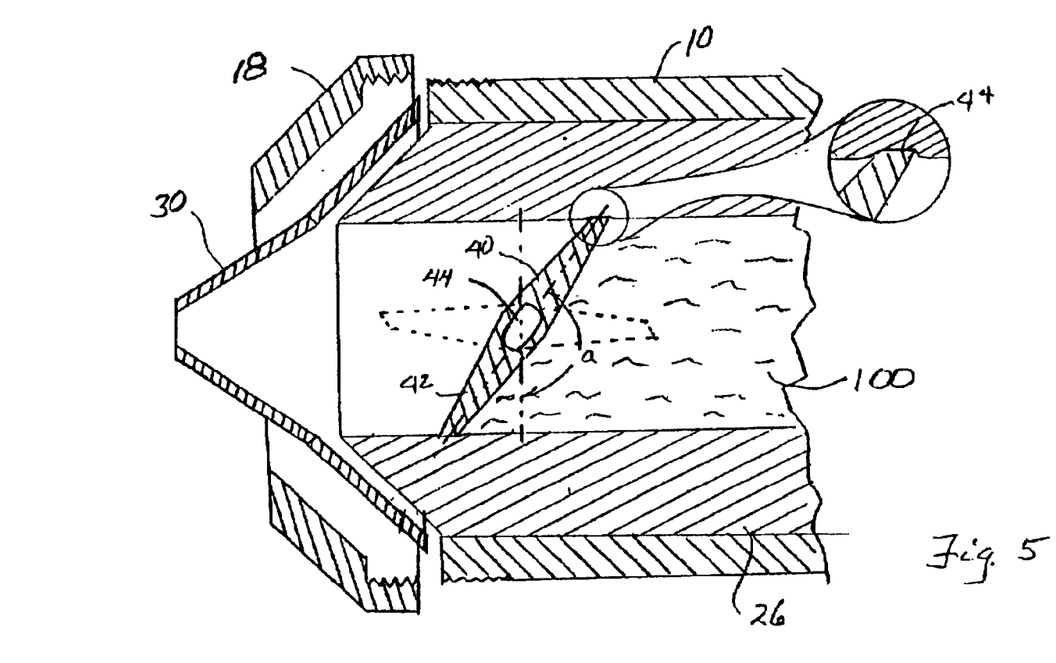
FIG. 5 is a top cross-sectional view showing the butterfly valve at 55 degrees with ends parallel to the handle passageway and pushing into the pliable neck to seal it. Phantom lines show the butterfly wings in open position. The handle cap and tip are shown slightly removed from the handle.

A butterfly valve 40 in the handle 10 and the reservoir neck 26 near the tip 30, in viscous fluid communication with the valve 40 and the reservoir 20, regulates extrusion of icing 100 from the reservoir 5. The butterfly valve 40 includes butterfly valve wings 42 on a shaft 44 that extends radially through the neck 26 out of the handle 10 to a shaft arm 46 parallel to the handle 10. The butterfly valve 40 is ellipsoidal in shape and of length such that in its close position its butterfly wings 42 close the neck 26. Wing ends 44 are parallel to the handle passageway 12 and neck opening with the wings 42 at angle, a, between 45 degrees and 60 degrees from a plane normal to the passageway, and ideally 55 degrees, pushing into the pliably soft neck 26 to effect the seal. The valve is necessarily near the tip 30 so when it is closed to seal the reservoir 20, the viscous icing 100 does not continue to ooze out of the tip 30.

Figure 2:
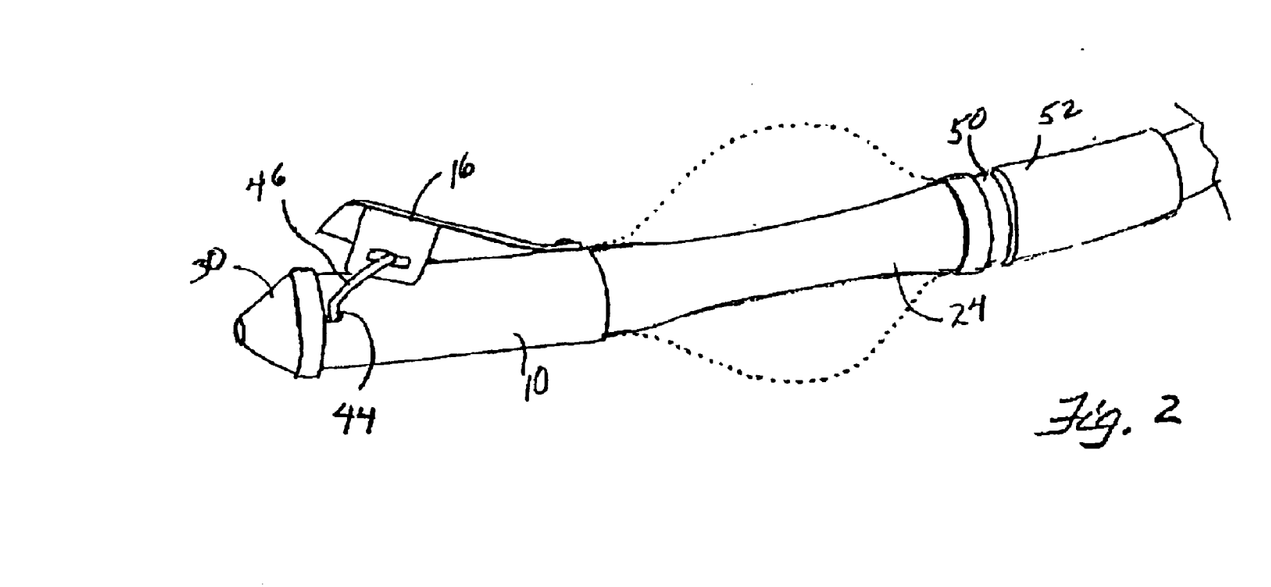
FIG. 2 is a perspective view of the icing dispenser shown with its reservoir collapsed without icing, with phantom lines showing the elastic reservoir bladder expanded uniformly in pressurizing icing within from around the entire icing content.

The reservoir bladder 24 is elastic and resilient, expanding under pressure of an icing load with a bias force uniformly exerted on the icing load around the bladder circumference as the elastic bladder 24 seeks to return to its unexpanded size, the bladder 24 thus adapted to receive icing and to exert positive pressure on the icing without pressure added to the reservoir by the operator or by mechanisms in the reservoir passageway, urging the icing to flow as a viscous fluid unencumbered within the reservoir and out the exhaust port. The constant pressure causes icing 100 within to extrude through the butterfly value 40 when open and out the decorator tip 30 at a consistent rate. The reservoir 5 also has a fill port 50 and a fill port valve 52 connected to the fill port 50.

Figure 6:
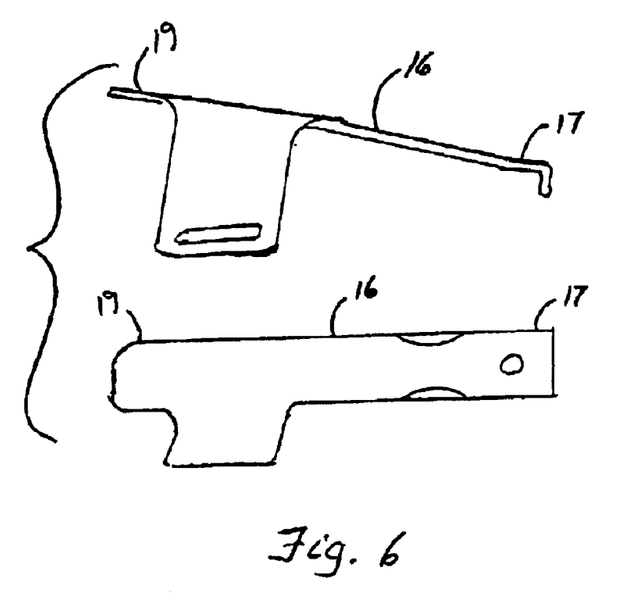
FIG. 6 is top and side views of the handle showing a hook for attachment at the handle rearward end near the reservoir bladder with its distal end extending forward at a raised angle, spaced apart from the handle. A slot is also shown through which the butterfly shaft is connected by its external arm passing slidable through the slot.

A lever 16 of spring material is mounted on the handle 10 at a handle rearward end 11 with a lever distal end 17 extending forward, spaced apart from the handle 10, to which the shaft arm 46 is slidably attached. Movement of the lever distal end 17 toward the handle 10 under spring tension causes the shaft arm 46 to move from the handle 10 tangentially, causing the butterfly shaft 44 to rotate. Position of the lever 16 then controls the position of butterfly wings 42 in the neck 26, modulating extrusion of icing past the butterfly valve 40 and past the tip 30.

The lever 16 is advantageously mounted with a first, proximal, end 17 rearward on the handle 10 and a second, distal, end 19 forward so an operator can hold the handle 10 and lever distal end 19 forward at the handle end in his or her fingers in the manner of a writing instrument. With the lever distal end 19 spaced away from the handle 10 near the tip 30, the operator is able to conveniently actuate the butterfly valve 40 with his or her fingers while exercising fine writing control such that the operator is able to draw with frosting from the dispenser while rotating the butterfly valve 40 to modulate a rate that icing 100 is dispensed from the decorator tip 30.

Figure 1:
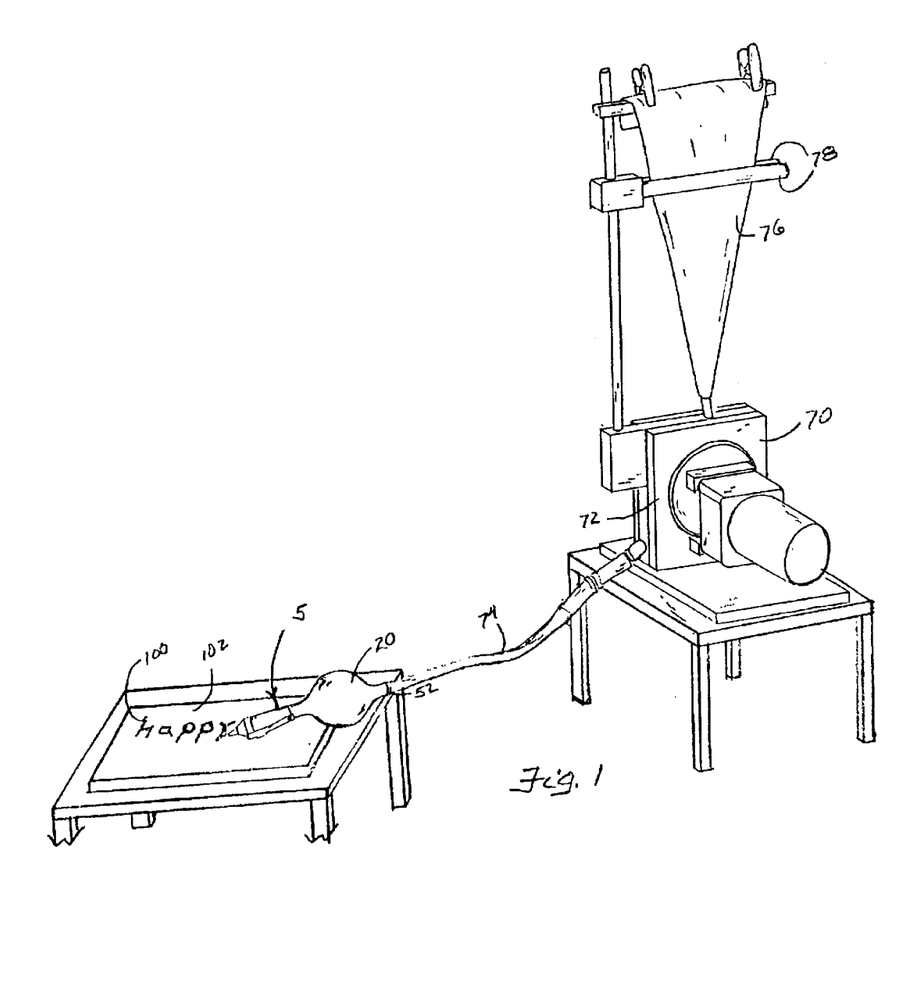
FIG. 1 is a perspective view of the icing dispenser of the present invention, shown connected to an icing pump that is fed by an icing hopper.

A fill mechanism 70 adapted to load icing 100 into the reservoir 20 through the reservoir fill port 50 comprises a pump 72 and a feed tube 74 between the pump 72 and the fill port valve 52. The reservoir 20 detachably connects to the fill mechanism 70 to receive an icing load into the reservoir. A soft-sided icing hopper 76 feeds icing to the pump 72 by action of a pair of opposing rollers 78. The opposing rollers 78 sandwich the soft-sided icing hopper therebetween under pressure and slowly roll over the soft-sided hopper 76 upon demand, urging icing 100 in the hopper 76 to transfer from the hopper 76 into the pump 72. Thus, the rollers 78 assist the pump 72 by urging icing 100 from the hopper 76 into the pump 72 under positive pressure.

Figure 3:
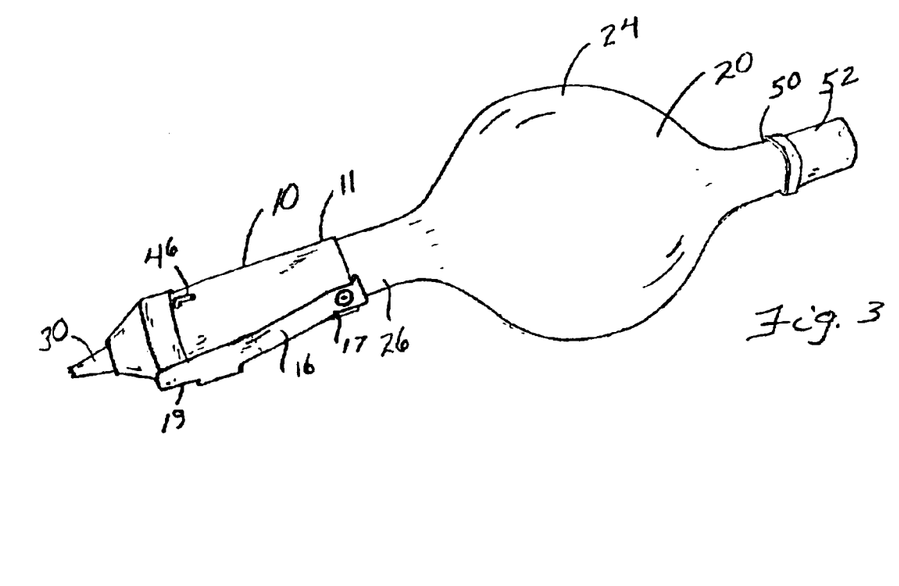
FIG. 3 is a perspective view of the dispenser shown disconnected from the fill pump. The dispenser can be operated disconnected from the fill pump after its bladder is filled with icing for ease of use, or it can remain connected to the pump and its hopper for continuous feed.

In a first operational use, the reservoir detaches from the fill mechanism 70 upon receiving an icing load for operation of the dispenser remotely from the fill mechanism 70. In a second operational use, the fill mechanism 70 connects to the reservoir fill port 50 by the feed tube 74 such that icing 100 flows from the hopper 76 into the reservoir 5 continuously or upon demand, in which case the reservoir bladder 24 expands and contracts as icing 100 is fed from the hopper 76 therein modulating the pressure that is exerted on icing 100 extruding from the reservoir neck 26.

In operation, an operator prepares to apply decorative icing 100 to a surface 102, typically a cake, by closing the butterfly valve 40 and filling the elastic, expandable reservoir bladder 24 with icing 100 with the elastic reservoir bladder 24 exerting uniform and constant pressure to the icing within. An icing decorator tip 30 is then attached to the distal end 14 of the handle 10 if not previously attached. Note that the tip 30 can be changed at any time by closing the butterfly valve 40 and removing a handle cap 18 that secures the tip to the handle distal end 14. The operator is then prepared to begin applying icing, which he or she does by opening the butterfly valve 40. This is done by actuating the lever 16 conveniently disposed on the handle 10 that opens the butterfly valve 40. The operator varies and controls the amount of icing 100 dispensed by modulating the position of the lever 16 relative to the handle 10.

What is claimed is:

1. A hand-held icing dispenser for use by an operator in decorating a cake with icing dispensed through an icing tip, comprising, a reservoir with an exhaust port, the reservoir comprising an unrestricted and unencumbered passageway therethrough, adapted to receive icing and to exert positive pressure on the icing without pressure added to the reservoir by the operator or by mechanisms in the reservoir passageway, urging the icing to flow unencumbered within the reservoir and out the exhaust port an exhaust valve functionally connected to the reservoir exhaust port modulating flow of icing from the reservoir, a handle to which the reservoir exhaust port is connected, a decorator tip removably connected to the handle in fluid communication with the exhaust valve, a fill mechanism adapted to load icing into the reservoir.

2. A hand-held icing dispenser for use by an operator in decorating a cake with icing dispensed through an icing tip, comprising, a reservoir with an exhaust port, adapted to receive icing and to exert positive pressure on the icing urging the icing to flow from the reservoir out the exhaust port without pressure added to the reservoir by the operator, an exhaust valve functionally connected to the reservoir exhaust port modulating flow of icing from the reservoir, a handle to which the reservoir exhaust port is connected, a decorator tip removably connected to the handle in fluid communication with the exhaust valve, a fill mechanism adapted to load icing into the reservoir, wherein the reservoir further comprises an expandable bladder elastic and compliant and adapted to receive icing, expanding with increased icing content loaded under external pressure, the bladder when expanded being under elastic bias to return to an unexpanded state exerting a constant pressure on icing within.

3. The icing dispenser of claim 2 wherein the handle has a through passageway and the tip is removably attachable to a handle distal end, and wherein the reservoir further comprises a neck extending from the reservoir bladder to the handle distal end with the exhaust valve in the neck adapted to regulate icing flow through the neck to the tip.

4. A hand-held icing dispenser for use by an operator in decorating a cake with icing dispensed through an icing tip, comprising, a reservoir with an exhaust port, adapted to receive icing and to exert positive pressure on the icing urging the icing to flow from the reservoir out the exhaust port without pressure added to the reservoir by the operator, a handle to which the reservoir exhaust port is connected, a lever with one end mounted rearward on the handle and another, distal, end extending forward toward the tip, spaced apart from the handle, an exhaust valve functionally connected to the reservoir exhaust port modulating flow of icing from the reservoir, comprising a butterfly valve with butterfly valve wings on a butterfly valve shaft rotatable between closed and selective open positions by mechanical connection to the lever such that movement of the lever distal end with respect to the handle causes the butterfly valve shaft and wings to rotate, the lever adapted to actuate the exhaust valve by movement of the lever distal end toward the handle, wherein the ends of said butterfly wings are of length such that they push into the pliable reservoir, resiliently deforming it around the wing ends in sealing it closed.

5. The icing dispenser of claim 4 wherein the butterfly valve wings when positioned to close the reservoir lie on a line between 45 degrees and 60 degrees from a line perpendicular, or transverse, to the reservoir at the butterfly valve.

6. The icing dispenser of claim 5 wherein the butterfly valve wings lie on a line 55 degrees from the line perpendicular to the passageway.

7. The icing dispenser of claim 4 wherein the handle has a through passageway with the butterfly valve and a portion of the reservoir within and ends of said butterfly wings are parallel to the passageway and reservoir portion at the valve when the valve is closed.

8. A hand-held icing dispenser for use by an operator in decorating a cake with icing dispensed through an icing tip, comprising, a reservoir with an exhaust port, adapted to receive icing and to exert positive pressure on the icing urging the icing to flow from the reservoir out the exhaust port without pressure added to the reservoir by the operator, an exhaust valve functionally connected to the reservoir exhaust port modulating flow of icing from the reservoir, a handle to which the reservoir exhaust port is connected, a decorator tit removably connected to the handle in fluid communication with the exhaust valve, a fill mechanism adapted to load icing into the reservoir, in which the reservoir is detachably connectable to the fill mechanism to receive an icing load into the reservoir, the reservoir detachable from the fill mechanism upon receiving an icing load for operation of the dispenser remotely from the fill mechanism.

9. The icing dispenser of claim 8 wherein the fill mechanism comprises a fill port in the reservoir, and a fill valve regulating flow through the fill port and attachable to an icing source.

10. The icing dispenser of claim 8 wherein the fill mechanism comprises a pump adapted to pump icing into the reservoir, and an icing hopper operationally connected to feed icing into the pump.

11. The icing dispenser of claim 1 further comprises an icing hopper and wherein the reservoir includes a fill port and wherein the fill mechanism comprises a feed tube between the icing hopper and the reservoir fill port continuously feeding icing from the hopper to the reservoir during operation of the dispenser.

12. A hand-held icing dispenser for use by an operator in decorating a cake with icing dispensed through an icing tip, comprising, a reservoir with an exhaust port and a fill port, adapted to receive icing and to exert positive pressure on the icing urging the icing to flow from the reservoir out the exhaust port without pressure added to the reservoir by the operator, an exhaust valve functionally connected to the reservoir exhaust port modulating flow of icing from the reservoir, a handle to which the reservoir exhaust port is connected, a decorator tip removably connected to the handle in fluid communication with the exhaust valve, a fill mechanism adapted to load icing into the reservoir comprising a feed tube between the icing hopper and the reservoir fill port continuously feeding icing from the hopper to the reservoir during operation of the dispenser, an icing hopper, in which the reservoir includes a bladder adapted to elastically expand and contract as icing is fed from the hopper under pressure to the reservoir, therein modulating pressure within the reservoir that is exerted on icing flowing from the reservoir exhaust port.

13. A hand-held icing dispenser for use by an operator in decorating a cake with icing dispensed through an icing tip, comprising, a reservoir with an exhaust port and a fill port, adapted to receive icing and to exert positive pressure on the icing urging the icing to flow from the reservoir out the exhaust port without pressure added to the reservoir by the operator, an exhaust valve functionally connected to the reservoir exhaust port modulating flow of icing from the reservoir, a handle to which the reservoir exhaust port is connected, a decorator tip removably connected to the handle in fluid communication with the exhaust valve, a fill mechanism adapted to load icing into the reservoir comprising a feed tube between the icing hopper and the reservoir fill port continuously feeding icing from the hopper to the reservoir during operation of the dispenser, an icing hopper, wherein the icing hopper is soft-sided and further comprises opposing feed rollers sandwiching the soft-sided icing hopper therebetween under pressure, the feed rollers rolling across the soft-sided hopper urging icing in the hopper to exhaust from the hopper into the reservoir.

14. The icing dispenser of claim 13 further comprising a pump between the hopper and the reservoir fill port, the rollers adapted to urge icing from the hopper into the pump under positive pressure.

15. A hand-held icing dispenser for use by an operator in decorating a cake comprising, a reservoir with an exhaust port and a fill port, the reservoir adapted to receive icing through the fill port, the reservoir further comprising an elastic and compliant bladder expanding with increased icing loaded under external pressure, the bladder when expanded being under elastic bias to return to an unexpanded state therein exerting a constant positive pressure on icing within urging the icing to flow from the reservoir out the exhaust port without pressure added to the reservoir by the operator, a fill valve regulating flow through the fill port and attachable to an icing source, an exhaust valve functionally connected to the reservoir exhaust port modulating flow of icing from the reservoir, a handle with a through passageway, the reservoir exhaust port connected to the handle, wherein the exhaust valve is actuated by a lever on the handle, the lever being disposed on the handle such that an operator holding the handle in a hand is able with the same hand to locate the lever at selective positions in modulating a flow rate of icing from the decorator tip, a decorator tip removably connected to the handle in fluid communication with the exhaust valve, wherein the tip is removably attachable to a handle distal end, and wherein the reservoir further comprises a neck extending from the reservoir bladder to the handle distal end with the exhaust valve in the neck and adapted to regulate icing flow through the neck to the tip, wherein the exhaust valve comprises a butterfly valve within the reservoir neck in the handle passageway, the butterfly valve comprising butterfly valve wings and a shaft rotatable between closed and selective open positions, the shaft extending out of the handle connected to the lever, adapted to actuate the valve at the handle, the butterfly valve wings lying on a line between 45 degrees and 60 degrees from a line perpendicular, or transverse, to the passageway with ends of said butterfly wings parallel to the passageway when the valve is closed, the ends of said butterfly wings being of length such that they push into the pliable reservoir neck, slightly deforming the neck, in sealing the neck closed, a fill mechanism adapted to fill the reservoir through the fill port under pressure.

16. The icing dispenser of claim 15 wherein the lever comprises one end mounted rearward on the handle and another, distal, end extending forward toward the tip, spaced apart from the handle, the lever adapted to actuate the exhaust valve by movement of the lever distal end toward the handle.

17. The icing dispenser of claim 16 wherein the handle and the lever distal end forward on the handle are adapted for holding in an operator's fingers as a writing instrument with icing flow modulated by finger adjustment of the lever distal end relative to the handle.

18. A hand-held dispenser for use by an operator in dispensing a viscous fluid comprising, a reservoir with an exhaust port and a fill port, the reservoir adapted to receive said viscous fluid through the fill port, the reservoir further comprising an elastic and compliant bladder expanding with increased said viscous fluid loaded under external pressure, the bladder when expanded being under elastic bias to return to an unexpanded state therein exerting a constant positive pressure on said viscous fluid within urging the said viscous fluid to flow from the reservoir out the exhaust port without pressure added to the reservoir by the operator, a fill valve regulating flow through the fill port and attachable to a viscous fluid source, an exhaust valve functionally connected to the reservoir exhaust port modulating flow of said viscous fluid from the reservoir, a handle with a through passageway, the reservoir exhaust port connected to the handle, wherein the exhaust valve is actuated by a lever on the handle, the lever being disposed on the handle such that an operator holding the handle in a hand is able with the same hand to locate the lever at selective positions in modulating a flow rate of said viscous fluid from the decorator tip, a decorator tip removably connected to the handle in fluid communication with the exhaust valve, wherein the tip is removably attachable to a handle distal end, and wherein the reservoir further comprises a neck extending from the reservoir bladder to the handle distal end with the exhaust valve in the neck and adapted to regulate said viscous fluid flow through the neck to the tip, wherein the exhaust valve comprises a butterfly valve within the reservoir neck in the handle passageway, the butterfly valve comprising butterfly valve wings and a shaft rotatable between closed and selective open positions, the shaft extending out of the handle connected to the lever, adapted to actuate the valve at the handle, the butterfly valve wings lying on a line between 45 degrees and 60 degrees from a line perpendicular, or transverse, to the passageway with ends of said butterfly wings parallel to the passageway when the valve is closed, the ends of said butterfly wings being of length such that they push into the pliable reservoir neck, slightly deforming the neck, in sealing the neck closed, a fill mechanism adapted to fill the reservoir through the fill port under pressure.

* * * * *